United States Patent
Dutta et al.

(10) Patent No.: US 7,668,724 B2
(45) Date of Patent: Feb. 23, 2010

(54) METHOD TO USE DMV WEB CONNECTION TO PROCESS TRAFFIC TICKETS, APPEALS, AND COURT FINES

(75) Inventors: Rabindranath Dutta, Austin, TX (US); Kumar Ravi, Cedar Park, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 09/956,773

(22) Filed: Sep. 20, 2001

(65) Prior Publication Data

US 2003/0055701 A1    Mar. 20, 2003

(51) Int. Cl.
- G07B 15/02    (2006.01)
- B41J 3/28    (2006.01)
- G06F 17/00    (2006.01)
- G06F 17/60    (2006.01)
- G08B 1/08    (2006.01)

(52) U.S. Cl. .............. 705/1; 400/23; 400/88; 400/48; 235/375; 235/384; 235/487; 340/539; 340/933; 340/936; 705/13; 364/464.28

(58) Field of Classification Search ............... None
See application file for complete search history.

(56) References Cited

U.S. PATENT DOCUMENTS

| | | | | |
|---|---|---|---|---|
| 5,459,304 A | | 10/1995 | Eisenmann | 235/380 |
| 5,740,050 A | * | 4/1998 | Ward, II | 705/418 |
| 5,875,431 A | | 2/1999 | Heckman et al. | 705/7 |
| 6,037,977 A | | 3/2000 | Peterson | 348/148 |
| 6,076,064 A | | 6/2000 | Rose, Jr. | 705/1 |
| 6,134,489 A | | 10/2000 | Smedley | 701/35 |
| 6,188,329 B1 | | 2/2001 | Glier et al. | 340/937 |
| 6,518,881 B2 | * | 2/2003 | Monroe | 340/539.1 |
| 6,823,317 B1 | * | 11/2004 | Ouimet et al. | 705/13 |

FOREIGN PATENT DOCUMENTS

| | | | | |
|---|---|---|---|---|
| GB | 2284290 | * | 5/1995 | |
| JP | 63-128472 | * | 6/1988 | |

(Continued)

OTHER PUBLICATIONS

Caught in the net of the law? Then pay your fine on web; Seattle Post; Apr. 2, 1998.*

(Continued)

Primary Examiner—John G. Weiss
Assistant Examiner—Matthew L. Brooks
(74) Attorney, Agent, or Firm—Yee & Associates, P.C.; Matthew W. Baca

(57) ABSTRACT

A method, system, and computer program product for processing traffic tickets is provided. In one embodiment, a department of motor vehicle (DMV) server receives, from a portable law enforcement data processing system via a network, citation data and stores the citation data. The DMV server then determines and notifies a court of jurisdiction of the citation data and receives, via the network, instructions from a client representing an accused about how the accused would like to proceed with the case. Based on the instructions received on behalf of the client, the DMV server modifies the citation data.

17 Claims, 6 Drawing Sheets

FOREIGN PATENT DOCUMENTS

WO     WO 97/14116    *    4/1997

OTHER PUBLICATIONS

"Ticketed motorists get help on Internet San Bernanrdino County offers online payment of most traffic tickets and traffic school"; The Press; Jan. 14, 2001. With attached website retrieved by the wayback machine with a date of May 2001.*

"Scales of Justice and Convenience Balanced with Online Ticket Payment System; Accesspoint Makes Paying Traffic Fines in Marietta, Ohio, as Easy as Clicking a Mouse"; George Taggart et al.; Business Wire, New York: Jun. 16, 2000 (attached herein).*

1 marked figure from patent No. 6,823,317.*

Leslie Busler. (Jan. 1998). Be alert for efficiency and safety. Public Roads, 61(4), 21-23. Retrieved Jul. 8, 2009, from Research Library. (Document ID: 27497391). (Alert).*

* cited by examiner

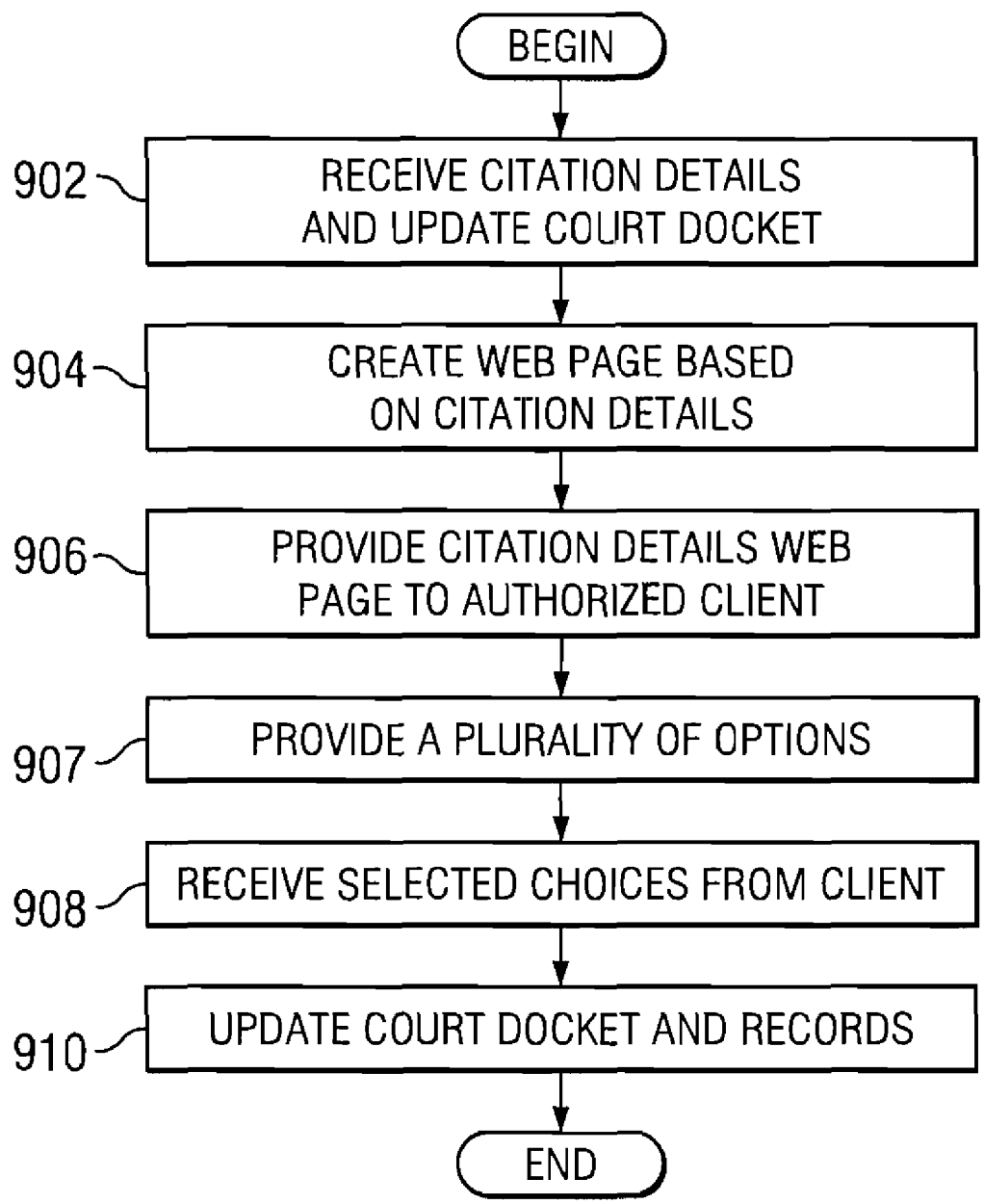

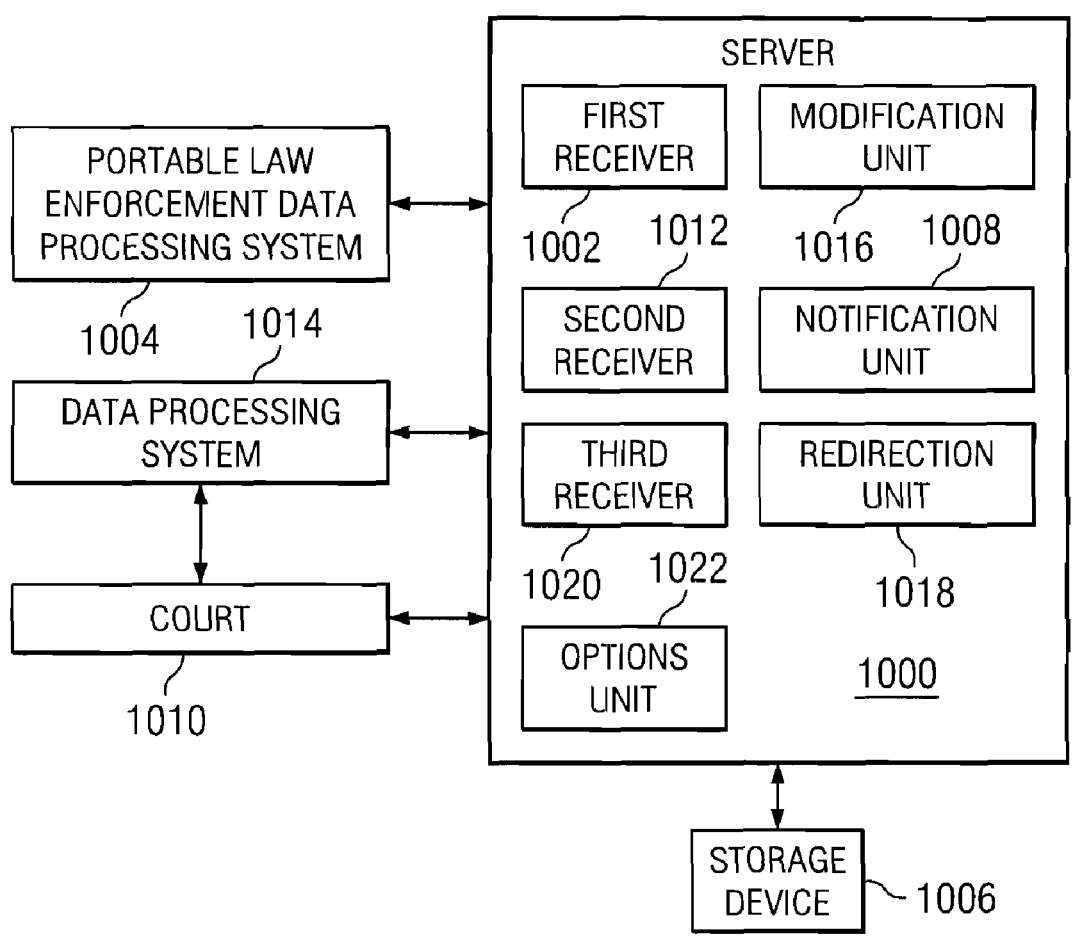

METHOD TO USE DMV WEB CONNECTION TO PROCESS TRAFFIC TICKETS, APPEALS, AND COURT FINES

BACKGROUND OF THE INVENTION

1. Technical Field

The present invention relates generally to computer software and, more specifically, to methods for processing traffic tickets via networked data processing systems.

2. Description of Related Art

With urban sprawl causing increased commuting distances and the transient nature of the workforce in the United States causing people to be on the highways more in order to visit family and friends in distant locals, people are on the highways and roads of the United States more than ever before. With this increased number of cars on the road and increases in the number and length of trips, road congestion has become a major problem. Furthermore, society has become increasingly time conscious. Frustrated or time rushed drivers driving at speeds above the posted speed limits are becoming more common. Therefore, municipalities and states are placing more resources into enforcing traffic laws.

Because of the transient nature of the American workforce, speeders and alleged speeders, in traversing long distances between their homes and family and friends, are receiving citations for speeding in locations greatly removed from their homes. Contesting these citations may be a problem because the court may be quite far from the individual's home. Similar problems exist for other types of legal violations as well.

Therefore, it would be desirable to have a method and system for processing traffic tickets utilizing the Internet, thereby enabling people to pay or contest traffic tickets from the convenience of their home or offices and avoid time consuming trips to distant locals to process traffic tickets.

SUMMARY OF THE INVENTION

The present invention provides a method, system, and computer program product for processing traffic tickets. In one embodiment, a department of motor vehicle (DMV) server receives, from a portable law enforcement data processing system via a network, citation data and stores the citation data. The DMV server then determines and notifies a court of jurisdiction of the citation data and receives, via the network, instructions from a client representing an accused about how the accused would like to proceed with the case. Based on the instructions received on behalf of the client, the DMV server modifies the citation data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 depicts an exemplary process flow and program function for disposing of traffic citations on an e-court server in accordance with the present invention; and FIG. 10 depicts a block diagram illustrating an exemplary server in accordance with an illustrative embodiment of the present invention.

DETAILED DESCRIPTION OF THE PREFERRED EMBODIMENT

Figure 1:
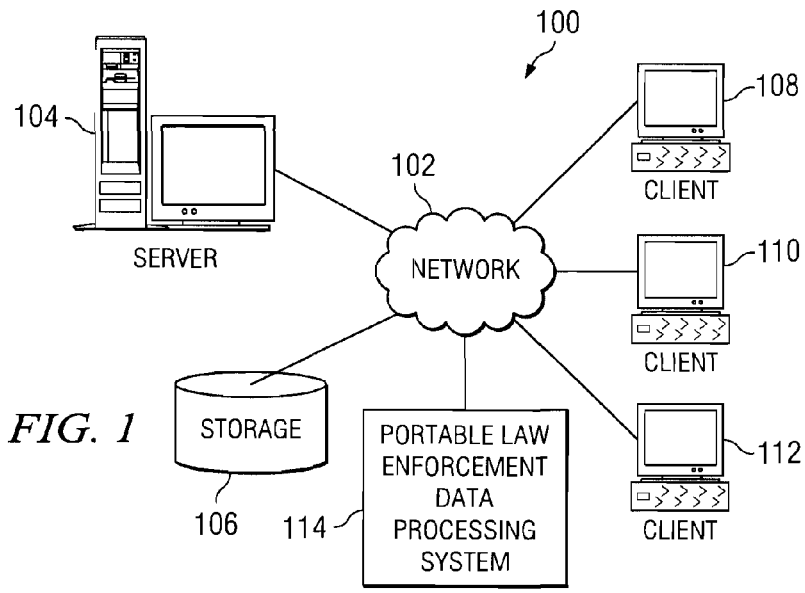
FIG. 1 depicts a pictorial representation of a network of data processing systems in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers, network computers, or hand held devices such as Personal Digital Assistants (PDAs). In the depicted example, server 104 provides data, such as boot files, operating system images, and applications to clients 108-112. Clients 108, 110, and 112 are clients to server 104.

Portable law enforcement data processing system 114 is also connected to network 102. Server 104, such as a department of motor vehicle (DMV) server, receives citation data from portable law enforcement data processing system 114 via network 102. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
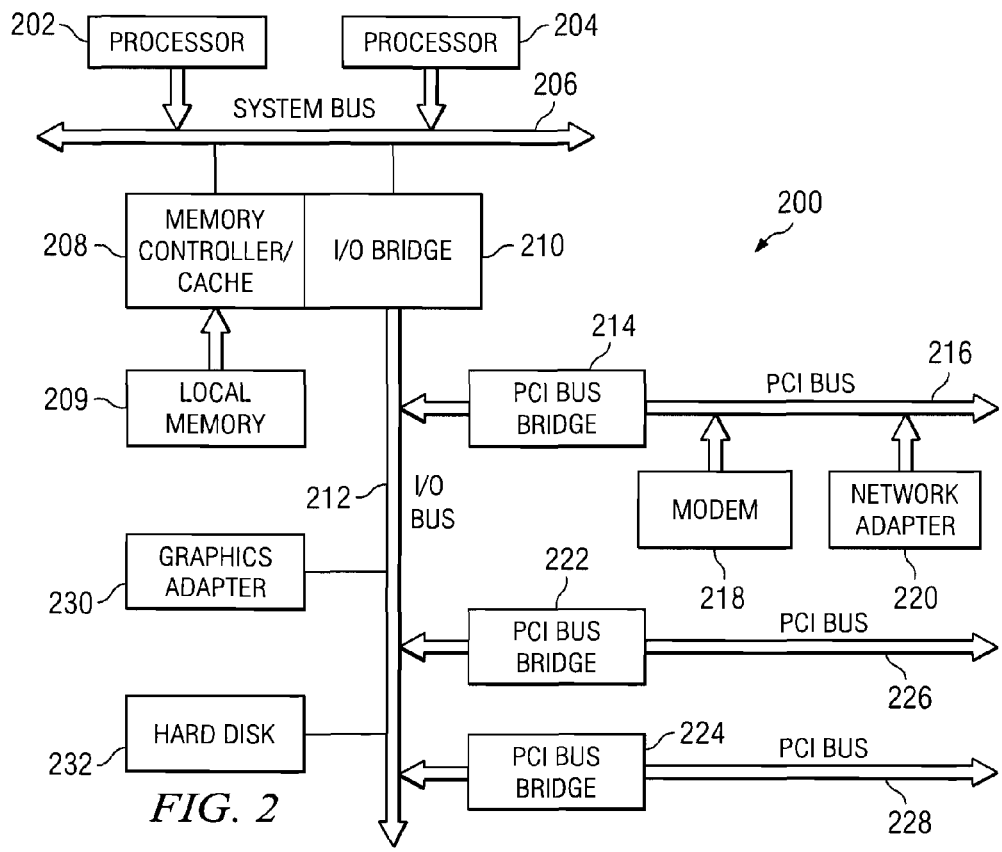
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
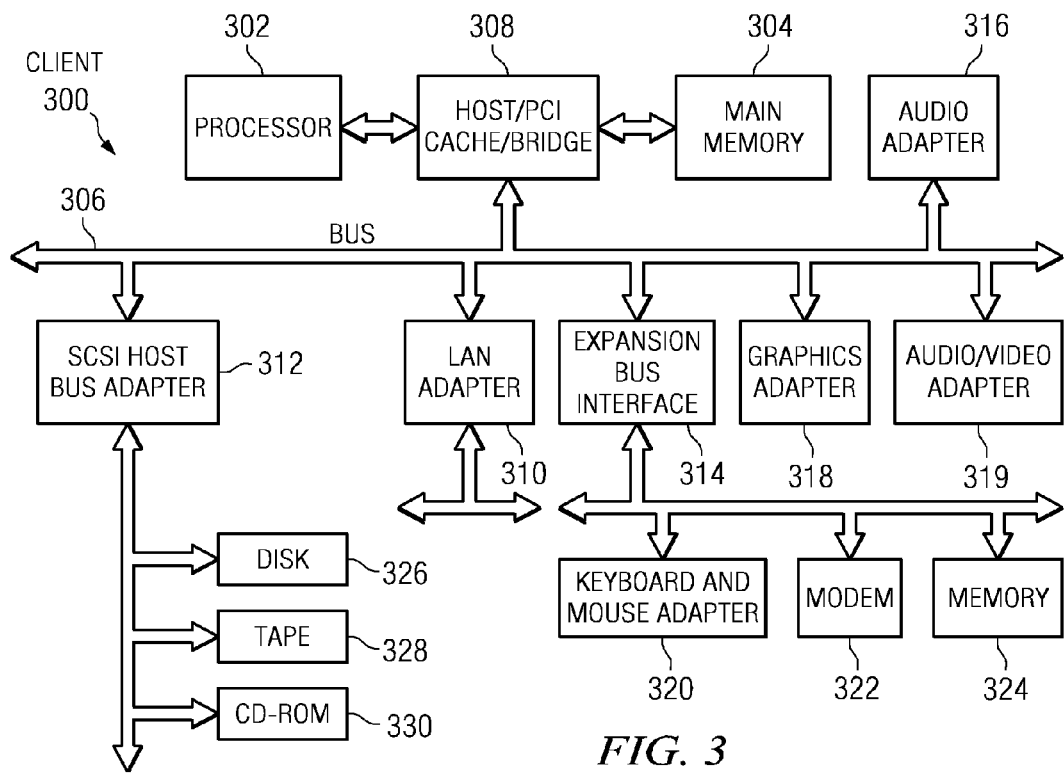
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
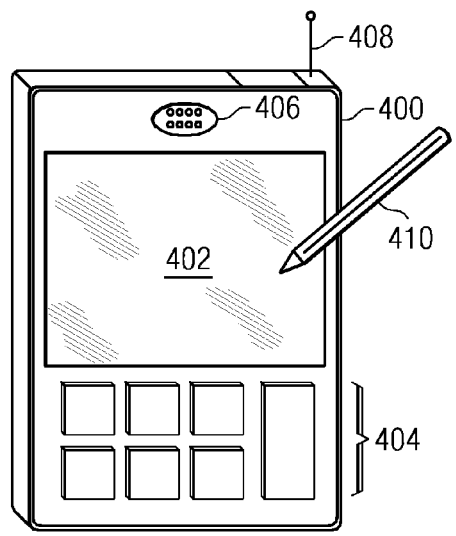
FIG. 4 depicts a diagram of a client in the form of a personal digital assistant (PDA) in accordance with a preferred embodiment of the present invention.

With reference now to FIG. 4, a diagram of a client in the form of a personal digital assistant (PDA) is depicted in accordance with a preferred embodiment of the present invention. The client is similar to clients 108, 110, and 112 of FIG. 1. PDA 400 includes a display 402 for presenting textual and graphical information. Display 402 may be a known display device, such as a liquid crystal display (LCD) device. The display may be used to present a map or directions, calendar information, a telephone directory, or an electronic mail message. In these examples, screen 402 may receive user input using an input device such as, for example, stylus 410.

PDA 400 may also include keypad 404, speaker 406, and antenna 408. Keypad 404 may be used to receive user input in addition to using screen 402. Speaker 406 provides a mechanism for audio output, such as presentation of an audio file. Antenna 408 provides a mechanism used in establishing a wireless communications link between PDA 400 and a network, such as network 102 in FIG. 1.

PDA 400 also preferably includes a graphical user interface that may be implemented by means of systems software residing in computer readable media in operation within PDA 400.

Figure 5:
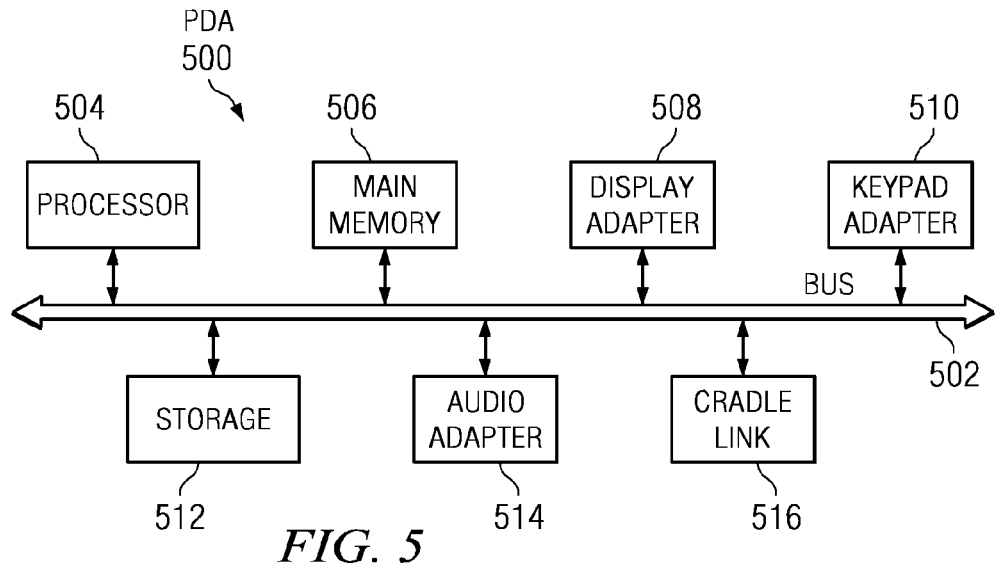
FIG. 5 depicts a block diagram of a PDA in accordance with a preferred embodiment of the present invention.

Turning now to FIG. 5, a block diagram of a PDA is shown in accordance with a preferred embodiment of the present invention. PDA 500 is an example of a PDA, such as PDA 400 in FIG. 4, in which code or instructions implementing the processes of the present invention may be located. PDA 500 includes a bus 502 to which processor 504 and main memory 506 are connected. Display adapter 508, keypad adapter 510, storage 512, and audio adapter 514 also are connected to bus 502. Cradle link 516 provides a mechanism to connect PDA 500 to a cradle used in synchronizing data in PDA 500 with another data processing system. Further, display adapter 508 also includes a mechanism to receive user input from a stylus when a touch screen display is employed.

An operating system runs on processor 504 and is used to coordinate and provide control of various components within PDA 500 in FIG. 5. The operating system may be, for example, a commercially available operating system such as Windows CE, which is available from Microsoft Corporation. Instructions for the operating system and applications or programs are located on storage devices, such as storage 512, and may be loaded into main memory 506 for execution by processor 504.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5.

The present invention provides a method and system for disposing of moving vehicle violation citations, such as, for example, a traffic ticket for speeding, via the Internet, or citations for other types of unlawful activities. The citation issued by a law enforcement officer may be entered into a portable data processing system by the issuing officer and transmitted to a central department of motor vehicle server, or server belonging to another agency responsible for driving records, licenses, and motor vehicles. People who have been issued traffic citations may dispose of the citation from their home or office by logging into the DMV server and paying the fine on-line or contesting the citation. Thus, people receiving citations avoid the inconvenience of traveling to a courthouse in a distant city and, perhaps, waiting in line, to contest the citation as well as the inconvenience of traveling to a post office to mail a check if not contesting the citation. Furthermore, the court system becomes more efficient by allowing citations to be processed on-line, thereby allowing court administrators to avoid dealing with masses of irritated people.

Figure 6:
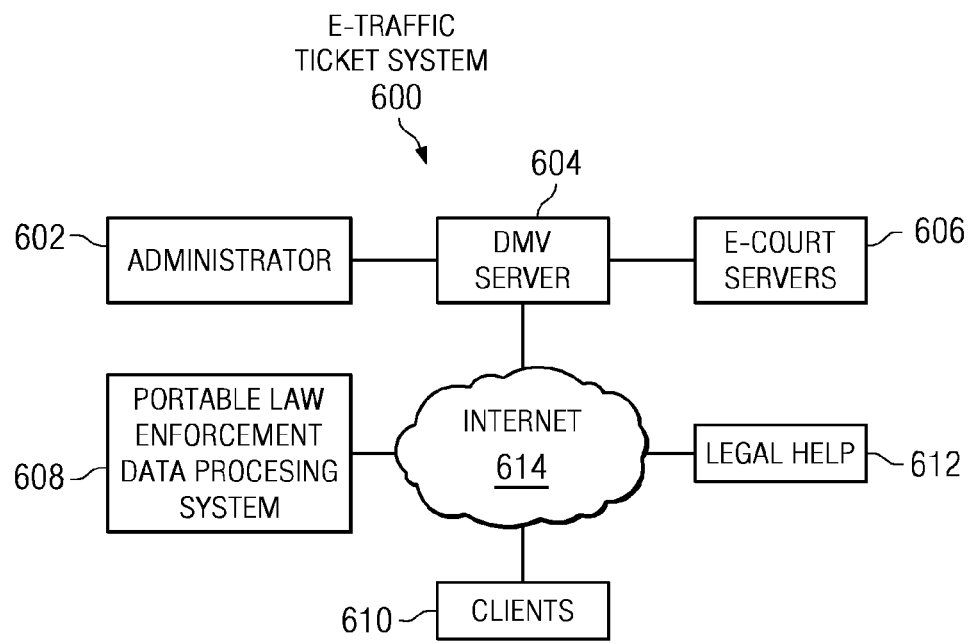
FIG. 6 depicts a block diagram illustrating an exemplary e-traffic ticket system in accordance with the present invention.

With reference now to FIG. 6, a block diagram illustrating an exemplary e-traffic ticket system is depicted in accordance with the present invention. E-traffic ticket system 600 includes a Department of Motor Vehicle (DMV) server 604, an administrator data processing system 602 connected to the DMV server 604, and a plurality of e-court servers 606 connected to the DMV server. E-court servers 606 may be connected to DMV server 604 directly as depicted in FIG. 6, or through a network, such as Internet 614. E-traffic ticket system 600 also includes a plurality of portable law enforcement data processing systems 608 connected to the DMV server 604 through a network, such as, for example, Internet 614. Clients 610 and legal help 612 may access the DMV server 604 via Internet 614 to act in the interest of the accused. The accused may represent herself from home or office utilizing client 610 or may request the aid of legal representation to utilize legal help 612 to represent her interests.

Portable law enforcement data processing systems 608 may be implemented using PDA's, such as PDA 400 of FIG. 4 or PDA 500 of FIG. 5. DMV server and e-court servers 606 may be implemented as, for example, server 200 in FIG. 2, and administrator data processing system 602, clients 610, and legal help 612 may be implemented as data processing system 300 in FIG. 3.

When a law enforcement officer stops an individual and issues a citation for a moving vehicle violation such as speeding, the officer enters the information (e.g., name, address, location of violation, make and model of vehicle, driver's license number, license plate number, insurance information, and description of violation) into portable law enforcement data processing systems 608. The information is then transmitted via Internet 614 to DMV server 604. The DMV server 604 stores the information in local or remote storage and also analyzes the information to determine the appropriate court having jurisdiction. The citation information is then transferred to the appropriate e-court server 606 corresponding to the court having jurisdiction which may then docket the case and send an e-mail notification to the e-mail address of the accused.

A DMV administrator or court administrator may log into the DMV server 604 through administrator data processing system 602 to update the data associated with the citation. Also, the DMV server 604 may be updated by the appropriate e-court server 606 in response to responses received from client 610 or legal help 612.

An accused may use a data processing system, such as client 610, to log into the DMV server 604 through Internet 614 and obtain access to the citation information as well as be informed of the web address of the appropriate e-court server. Alternatively, the DMV server may redirect client 610 to the appropriate e-court server 606.

Once logged into the appropriate e-court server 606, the accused utilizing client 610 or the accused's representative utilizing legal help 612 may choose to pay the fine associated with the citation, set a court date to appear in court to contest the citation, or appeal an adverse ruling on the citation. The e-court server 606 then updates the courts docket appropriately and updates the DMV server 604. If the accused fails to pay the fine or appear at the scheduled time, notification that an arrest warrant has been issued by the presiding judge may be sent to the DMV server such that officers throughout the state or jurisdiction may be made aware of the outstanding warrant for the individual.

Figure 7:
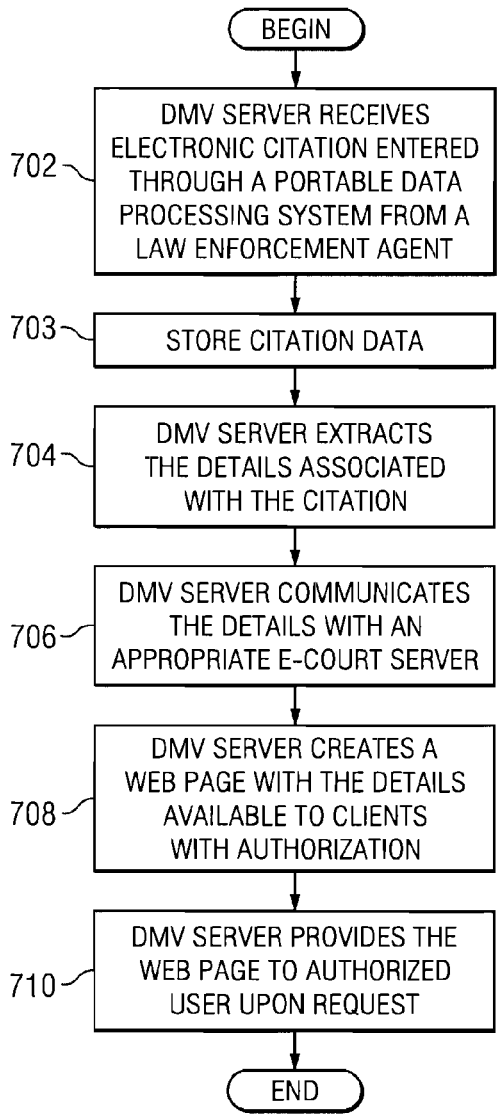
FIG. 7 depicts an exemplary process flow and program function for processing an electronic citation on a DMV server in accordance with the present invention.

With reference now to FIG. 7, an exemplary process flow and program function for processing an electronic citation on a DMV server is depicted in accordance with the present invention. To begin, the DMV server receives an electronic citation entered through a portable law enforcement data processing system from a law enforcement agent (step 702). The DMV server stores the citation data in a storage device (step 703). The DMV server then extracts the details associated with the citation (step 704), such as, location determining appropriate court with jurisdiction, and communicates the details with the appropriate e-court server associated with the court having jurisdiction over the citation (step 706).

The DMV server then creates a web page corresponding to the citation and makes the web page available to the accused or accused's representative (step 708). The accused may be provided with a citation identification or another security feature may be associated with the citation preventing unauthorized access to the citation web page. Upon receiving a request from an authorized user, the DMV server provides the citation web page to the requesting user (step 710).

Figure 8:
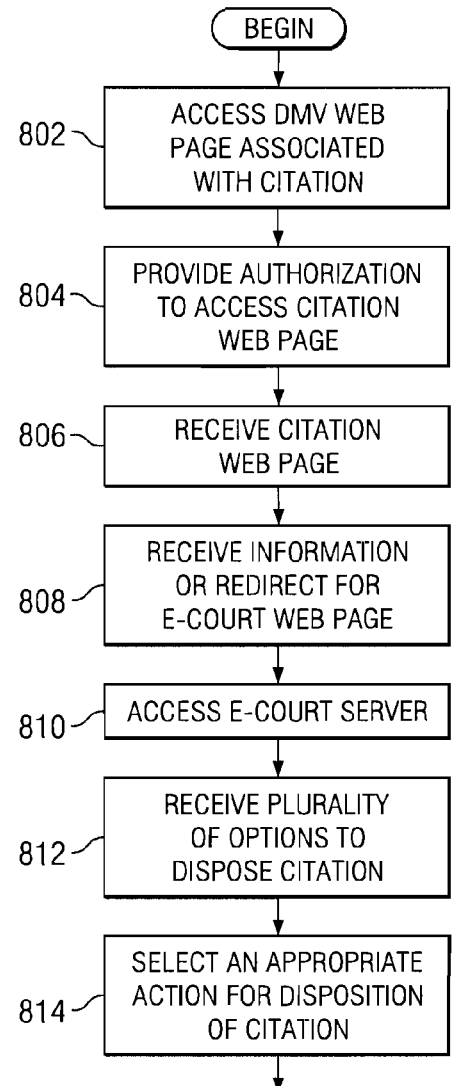
FIG. 8 depicts an exemplary process flow and program function illustrating client interaction with the DMV server in accordance with the present invention.

With reference now to FIG. 8, an exemplary process flow and program function illustrating an accused utilizing a data processing system, such as a client, to interact with the DMV server is depicted in accordance with the present invention. An accused (or representative) accesses the DMV web page associated with the citation (step 802). The address for accessing the web page may have been provided to the accused at the time the officer issued the citation. The accused then provides authorization to access the citation web page (step 804) and receives the citation web page containing information about the citation (step 806).

The accused may also receive information related to accessing the e-court web page or may be redirected to the e-court web page (step 808). The accused then accesses the e-court server web page associated with the citation (step 810). The accused then receives a plurality of options to dispose of the citation (step 812) and selects an appropriate action for disposition of citation (step 814). For example, the accused may choose to pay the fine on-line, contest the charges, schedule a court date, or appeal an adverse decision.

With reference now to FIG. 9, an exemplary process flow and program function for disposing of traffic citations on an e-court server is depicted in accordance with the present invention. To begin, the e-court server receives citation details from the DMV server and updates the court docket (step 902). The e-court server then creates a web page based on the citation details (step 904) and provides the citation details on the web page to an authorized client utilized by the accused or the accused's representative (step 906). The e-court server provides a plurality of options to the client (step 907). Once the accused or accused's representative chooses an option utilizing the client, the selected choices are transmitted to and received by the e-court server (step 908). The e-court server then updates the court docket and records and updates the DMV server (step 910).

FIG. 10 depicts a block diagram illustrating an exemplary server in accordance with an illustrative embodiment of the present invention. Server 1000 is a server, such as server 104 in FIG. 1.

Citation data is entered through the portable law enforcement data processing system. First receiver 1002 receives citation data from portable law enforcement data processing system 1004 via a network. Storage device 1006 stores the citation data. Notification unit 1008 determines and notifies court 1010 of the citation data. Court 1010 is a court of jurisdiction. Second receiver 1012 receives instructions via the network from an accused by data processing system 1014 used by the accused. Modification unit 1016 modifies the citation data based on the accused instructions. In one embodiment, the accused instructions are transmitted by an authorized representative for the accused, and wherein the accused instructions include a security feature granting authority to the authorized representative.

Redirection unit 1018 redirects data processing system 1014 used by the accused to an appropriate server of court 1010, which is the applicable court of jurisdiction. Third receiver 1020 receives court instructions via the network. The court instructions include at least one of dismissal of the citation, conviction, assessing a fine, setting a new court appearance date, and issuing an arrest warrant. Modification unit 1016 modifies the citation data based on the court instructions. Notification unit 1008 notifies the accused of the modifications to the citation data based on the court instructions.

Options unit 1022 provides data processing system 1014 used by the accused with a plurality of options. First receiver 1002 receives a selection from the plurality of options. The plurality of options includes at least one of paying a fine associated with the citation, setting a court appearance date, and appealing a decision of the court.

Although described with reference to redirection from the DMV server to the e-court server for processing, the citation may be processed through the DMV server with appropriate notices and updates sent to the court and accused as necessary. Furthermore, rather than automatically selecting a court based on citation information, a DMV administrator or other administrator may access the DMV server through administrator data processing system 602 and may assign a particular court, judge, and court date to a case. Although the invention has been described primarily with reference to moving vehicle violations, it should be noted that the present invention may be applied to other types of traffic citations or other types of citations for violations of the law.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing traffic citation data, the computer implemented method comprising:
    receiving citation data regarding a citation for a vehicle traffic violation from a portable law enforcement data processing system via a network by a first server that manages motor vehicle license data, wherein the citation data includes an identity of an accused;
    responsive to receiving the citation data, determining by the first server a court having legal jurisdiction by analyzing the citation data;
    responsive to determining the court having legal jurisdiction, sending the citation data by the first server to a second server that manages court docket information for the court having legal jurisdiction;
    generating a web page containing the citation data, wherein the web page is accessible via authorized access from a client data processing system associated with the identity of the accused;
    and
    responsive to receiving instructions from the court having legal jurisdiction associated with the second server, modifying the citation data, by the first server, based on instructions sent from the client data processing system and based on the instructions from the court having legal jurisdiction.

2. The computer implemented method as recited in claim 1, further comprising:
    responsive to the accused logging into the first server through the Internet via the client data processing system associated with the identity of the accused, redirecting the client data processing system used by the accused to the second server of the court having legal jurisdiction.

3. The computer implemented method as recited in claim 1, further comprising:

responsive to receiving a response from the accused or a representative of the accused by the second server associated with the court having legal jurisdiction, updating the first server by the second server.

4. The computer implemented method as recited in claim 1 further comprising:
providing the accused with a plurality of options, by the first server; and
responsive to a selection being made by the accused or a representative of the accused receiving a selection from the plurality of options.

5. The computer implemented method as recited in claim 4, wherein the plurality of options includes at least two of paying a fine associated with the citation, setting a court appearance date, and appealing a decision of the court.

6. The computer implemented method as recited in claim 3, wherein the instructions from the court having legal jurisdiction include at least one of dismissal of the citation, conviction, assessing a fine, setting a new court appearance date, and issuing an arrest warrant.

7. The computer implemented method as recited in claim 1, wherein the citation data is processed through the first server with appropriate notices and updates sent to the second server associated with the court having legal jurisdiction and the client data processing system associated with the identity of the accused.

8. The computer implemented method as recited in claim 1, further comprising:
responsive to the modification of the citation data based on the instructions from the court having legal jurisdiction, providing a notice to the accused of the modification to the citation data.

9. The computer implemented method of claim 1 further comprising:
responsive to receiving the citation data from the first server, updating a court docket associated with the citation by the second server; and
responsive to the second server receiving a response from the accused choosing to pay a fine, set a court data, or appear in court to contest the citation, updating the first server by the second server.

10. The computer implemented method of claim 1 further comprising:
responsive to an arrest warrant associated with the citation being issued by a presiding judge, sending notification that the arrest warrant has been issued to the second server by the first server.

11. A system for processing traffic tickets, the system comprising:
a first receiver of a first server which receives citation data regarding a citation for a vehicle traffic violation from a portable law enforcement data processing system via a network by a first server that manages motor vehicle license data, wherein the citation data includes an identity of an accused;
a processor of the first server, wherein the processor analyzes the citation data and determines a court having legal jurisdiction;
a notification unit of the first server, wherein the notification unit sends the citation data to a court server that manages court docket information for the court having legal jurisdiction in response to determining the court having legal jurisdiction;
a second receiver of the first server which receives, via the network, instructions from a client data processing system associated with the identity of the accused; and
a modification unit of the first server which modifies the citation data based on the instructions from the client data processing system and based on instructions received from the court server of the court having legal jurisdiction.

12. The system as recited in claim 11, further comprising:
a redirection unit of the first server which redirects the client data processing system associated with the identity of the accused to the court server associated with the court having legal jurisdiction in response to the accused logging into the first server through the Internet.

13. The system as recited in claim 11, further comprising:
a fourth receiver of the first server, wherein the fourth receiver receives updates from the court server in response to the court server receiving a response from the accused or a representative of the accused.

14. The system as recited in claim 11, further comprising:
an options unit which provides the accused with a plurality of options; and
wherein the first receiver receives a selection from the plurality of options made by the accused or a representative of the accused.

15. The system as recited in claim 14, wherein the plurality of options includes at least two of paying a fine associated with the citation, setting a court appearance date, and appealing a decision of the court.

16. The system as recited in claim 13, wherein the instructions from the court having legal jurisdiction include at least one of dismissal of the citation, conviction, assessing a fine, setting a new court appearance date, and issuing an arrest warrant.

17. The system as recited in claim 11, wherein the citation data is processed through the first server with appropriate notices and updates sent to the court server associated with the court having legal jurisdiction and the client data processing system associated with the identity of the accused.

* * * * *

UNITED STATES PATENT AND TRADEMARK OFFICE
CERTIFICATE OF CORRECTION

PATENT NO. : 7,668,724 B2 Page 1 of 1
APPLICATION NO. : 09/956773
DATED : February 23, 2010
INVENTOR(S) : Dutta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1784 days.

Signed and Sealed this

Seventh Day of December, 2010

David J. Kappos
*Director of the United States Patent and Trademark Office*